United States Patent
Patfield

(10) Patent No.: US 7,123,286 B2
(45) Date of Patent: Oct. 17, 2006

(54) PRESENCE DETECTION FOR IP TELEPHONY

(75) Inventor: Kevin M. Patfield, Phoenix, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/714,201

(22) Filed: Nov. 14, 2003

(65) Prior Publication Data

US 2005/0105698 A1   May 19, 2005

(51) Int. Cl.
*H04N 7/14* (2006.01)

(52) U.S. Cl. .................................................. 348/15

(58) Field of Classification Search .............. 379/93.21
See application file for complete search history.

(56) References Cited

U.S. PATENT DOCUMENTS

| 6,108,028 A * | 8/2000 | Skarbo et al. ........... 348/14.03 |
| 6,456,275 B1 * | 9/2002 | Hinckley et al. ........... 345/156 |
| 6,633,318 B1 * | 10/2003 | Kim et al. .................. 715/867 |

* cited by examiner

*Primary Examiner*—Creighton Smith

(57) ABSTRACT

A method of detecting a user's presence at a workstation is provided. The workstation includes a computer (12) having an operating system (100) that has an interface for communicating with a screen saver (110). The interface provides for screen saver communications intended to selectively result in screen saver activation and screen saver deactivation. The method includes: detecting the screen saver communications; determining that the user is not present at the workstation when the detected communications are intended to result in screen saver activation; and, determining that the user is present at the workstation when the detected communications are intended to result in screen saver deactivation.

18 Claims, 2 Drawing Sheets

PRESENCE DETECTION FOR IP TELEPHONY

FIELD

The present inventive subject matter relates to the telecommunications arts. Particular application is found in conjunction with Internet Protocol (IP) telephony, and the specification makes particular reference thereto. However, it is to be appreciated that aspects of the present inventive subject matter are also amenable to other like applications.

BACKGROUND

It is a common practice to use packet-switched networks, such as IP networks, to connect calls (e.g., voice, data or multimedia calls) between end users. For example, Voice over IP (VoIP) has been developed to permit Customer Premises Equipment (CPE), such as IP telephones, to be connected over an IP network so that end users may exchange voice communications via the connected CPE. Moreover, IP gateways have been developed that bridge IP networks with the Public Switch Telephone Network (PSTN), a circuit-switched network as opposed to a packet-switched network. That is to say, an IP gateway acts as a point of entry for IP calls into the PSTN, e.g., via a telephone switch, such as a class 5 switch, and vice versa for calls from the PSTN into the IP network.

Other types of real-time communications are also known which utilize an IP or other packet-switched network, e.g., Instant Messaging (IM). Via computers operatively connected to a common network (typically, the Internet), IM permits end users to exchange communications (e.g., text-based messages) with one another over that network in substantially real-time. Commonly, an IM client running on the end user's computer is employed to send and/or receive an IM message. In some cases, IM clients support a kind of presence detection so that end users connected to the network can detect the presence of other end users similarly connected to the network. In this manner, the end users are made aware of who is connected to the network and/or their availability for IM. Such presence detection often relies upon the end user being logged in or out of their IM client, the network, etc. This approach, however, can lead to unreliable detection of an end user's actual state of presence at their computer, e.g., when an end user forgets to log in or out so as to appropriately reflect their actual state of presence at their computer.

Furthermore, the concept of presence detection has not heretofore been suitably extended to IP telephony. Nevertheless, the suitable application of presence detection to IP telephony achieves, in certain instances, desirable results, the benefits and/or advantages of which have not been previously realized.

Accordingly, a new and improved approach to presence detection is disclosed that overcomes the above-referenced problems and others.

SUMMARY

In accordance with one preferred embodiment, a method of detecting a user's presence at a work station is provided. The workstation includes a computer having an operating system that has an interface for communicating with a screen saver. The interface provides for screen saver communications intended to selectively result in screen saver activation and screen saver deactivation. The method includes: detecting the screen saver communications; determining that the user is not present at the workstation when the detected communications are intended to result in screen saver activation; and, determining that the user is present at the workstation when the detected communications are intended to result in screen saver deactivation.

In accordance with another preferred embodiment, a module for detecting a user's presence at a workstation is provided in a computer that is part of the workstation. The computer includes an operating system that has an interface for communicating with a screen saver, the interface providing for screen saver communications intended to selectively result in screen saver activation and screen saver deactivation. The module includes: means for detecting the screen saver communications; and, means for determining: (i) that the user is not present at the workstation when the detected communications are intended to result in screen saver activation; and, (ii) that the user is present at the workstation when the detected communications are intended to result in screen saver deactivation.

In accordance with yet another preferred embodiment, a workstation includes: a computer having a visual display screen and an input device, both operatively connected to the computer; a operating system maintained on the computer for administering operation of the computer; a screen saver regulated by the operating system so as to selectively be in one of an activated or deactivated state, the screen saver being in the deactivated state when the input device is being used and in the activated state when the input device goes unused for a specified duration of time, such that while in the activated state the screen saver controls the display screen to depict at least one of no image or a non-static image; and, presence detection means for detecting a user's presence at the workstation from the state of the screen saver.

Numerous advantages and benefits of the inventive subject matter disclosed herein will become apparent to those of ordinary skill in the art upon reading and understanding the present specification.

BRIEF DESCRIPTION OF THE DRAWINGS

Preferred embodiments may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional network elements, entities and/or facilities, relevant communications standards, protocols and/or services, and other components that are commonly known in the telecommunications art without further detailed explanation as to their configuration or operation except to the extent they have been modified or altered in accordance with and/or to accommodate the preferred embodiment(s) presented.

Figure 1:
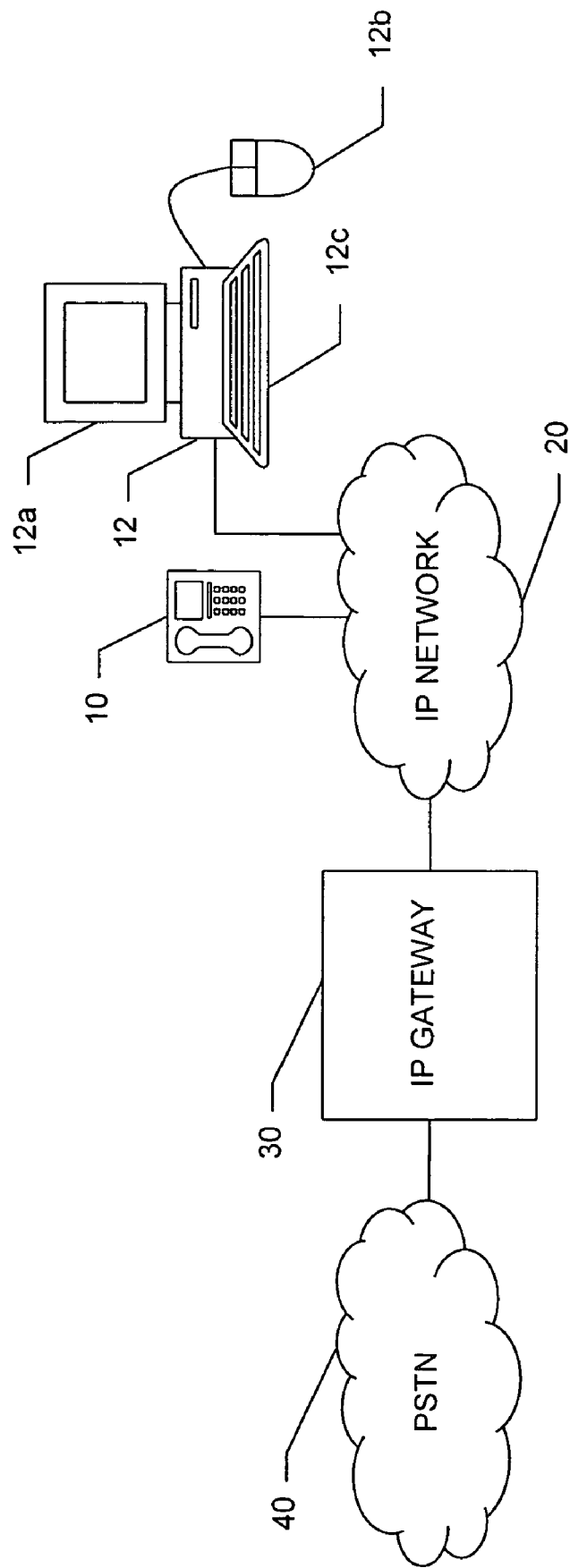
FIG. 1 is a block diagram showing a telecommunications system suitably for practicing aspects of presence detection in accordance with an exemplary embodiment of the same.

With reference to FIG. 1, an exemplary configuration of an IP telephony system is shown in accordance with an embodiment of the same that is suitable for practicing aspects of the present invention. In particular, FIG. 1 shows an IP telephone 10 operatively connected to an IP network 20 (i.e., a packet-switched network) so that an end user employing the same may exchange communications with others. An IP gateway 30 provides a bridge between the IP network 20 and PSTN 40 (i.e., a circuit-switched network). That is to say, the IP gateway 30 acts as a point of entry for packet-switched calls from the IP network 20 headed into the PSTN 40, and similarly acts as a point of entry for circuit-switched calls from the PSTN 40 headed into the IP network 20. In the usual manner, the IP gateway 30 selectively converts and/or translates packet-switched calls into circuit-switched calls and vice versa depending on the direction of traffic flow. Suitably, a computer 12 or some similar workstation, terminal, etc. is also operationally connected to the IP network 20. The end user therefore has the option of interacting with IP telephony system via either or both the telephone 10 and/or computer 12.

It is to be appreciated that while the network 20 and gateway 30 have been referred to as an IP network and IP gateway, the network 20 and/or gateway 30 may be of any suitable packet-switched type. For illustrative purposes, the CPE is shown as an IP telephone 10, e.g., used to conduct a VoIP call. However, it is to be appreciated that the CPE may be any appropriate type of CPE as is known in the art for conducting various types of IP or packet-switch calls, e.g., voice, data, multimedia, etc. Further, it is to be appreciated that while only the one particular end user arrangement is shown (i.e., the telephone 10 and computer 12), a plurality of such similarly situated arrangements are contemplated.

Suitably, the IP telephone 10 and computer 12 are located in relatively close proximity to one another, e.g., in the same office or room, on the same desk, in the same cubicle, etc. That is to say, the proximity of the telephone 10 and the computer 12 with respect to one another is such that, given an indication of the end user's presence at the computer 12, it can be reasonably inferred that the end user is also present at the telephone 10.

Figure 2:
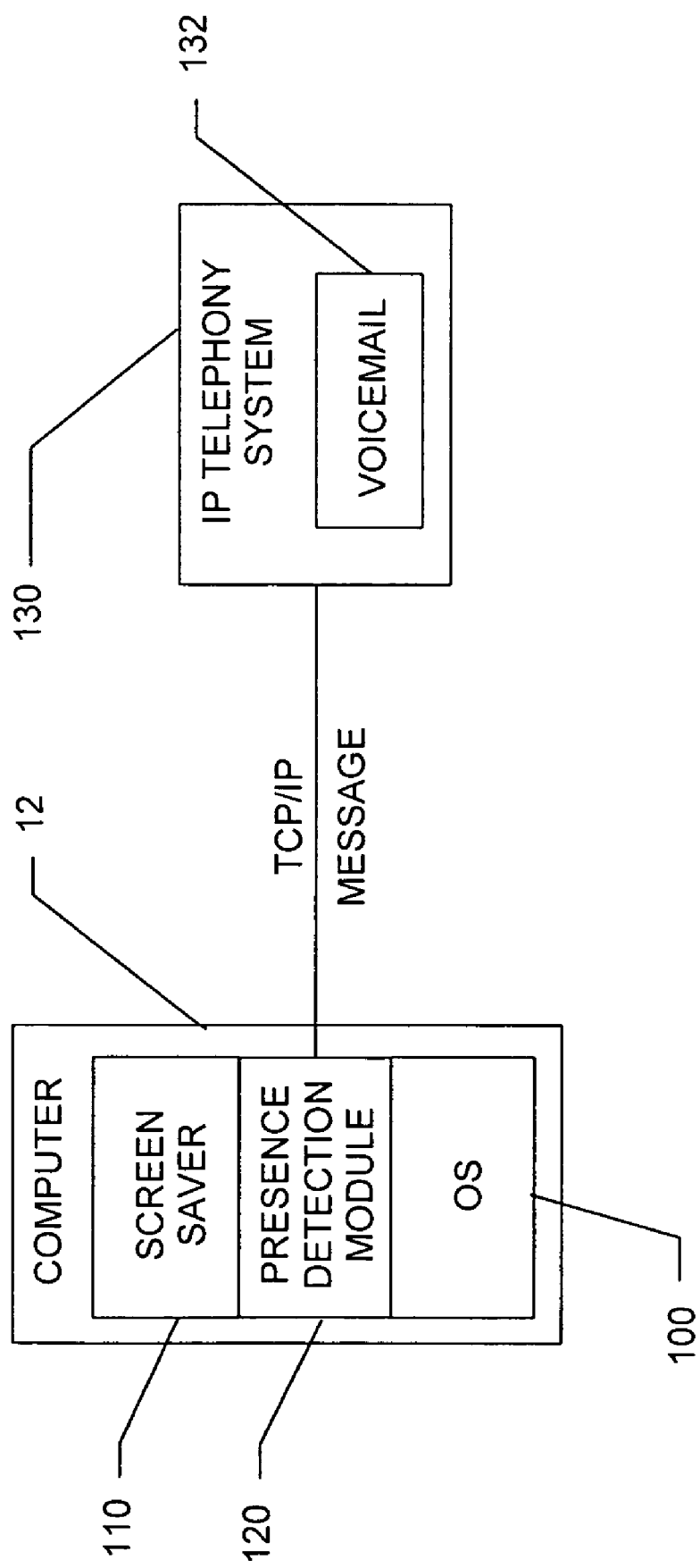
FIG. 2 is a block diagram showing a presence detection module in accordance with an exemplary embodiment of the same.

With reference to FIG. 2, operation of the computer 12 is controlled and/or administered by a computer operating system (OS) 100 suitably running, loaded and/or maintained thereon, as is known in the art. For example, the OS 100 is optionally any well known commercially available OS, e.g., the Windows® brand of OS supplied by Microsoft Corporation, DOS, UNIX, OS/2, Linux, or another commercially available OS, or a custom programmed OS, or the like. The computer 12 is also equipped in the usual manner with a monitor, screen or other like visual display 12a (see FIG. 1), input devices such as the illustrated mouse 12b and keyboard 12c, etc.

In the customary manner, the computer 12 is also equipped with and/or employs a screen saver (SS) 110. Typically, the SS 110 is a small program that takes over the display 12a if there are no keystrokes on the keyboard 12c or movements of the mouse 12b detected for a specified duration. Screen savers were originally developed to prevent ghosting, i.e., the permanent etching of a pattern on a display due to prolonged depiction of a static image. The SS 110 prevents ghosting by either blanking out the display 12a entirely or by having the display 12a output a non-static or moving image after a duration of time has expired without a keystroke or mouse movement. Ghosting is most often associated with older monochromatic monitors. Modern displays commonly do not suffer so much from the ghosting problem. Therefore, screen savers are at times no more than ornamental, i.e., a way to liven up the computer 12. However, they do provide another benefit, e.g., hiding a user's work from unauthorized individuals who may attempt to view the work on the screen 12a while the user is away. In this case, the SS 110 typically does not return the display 12a to the regular display mode until a password is entered or some other security clearance is achieved. In other instances, the computer 12 "wakes up" (i.e., returns to the normal display mode by deactivation of the SS 110) simply when a keystroke on the keyboard 12c or use of the mouse 12b is detected.

Operationally, if a keystroke on the keyboard 12c or use of the mouse 12b are not detected for a given duration of time, the OS 100 will activate the SS 110 in the usual manner, e.g., by signalling the SS 110 to activate, by setting a flag which is checked by the SS 110 to determine when to activate, or by some other like interface between the OS 100 and SS 110. Similarly, through the same interface, the OS 100 also controls deactivation of the SS 110 when appropriate. Suitably, the given duration of time is optionally set by the user employing the computer 12. It is to be appreciated that a lack of keyboard/mouse interaction with the computer 12 by the user for the given duration of time is often indicative of the user's absence (i.e., lack of presence at the computer 12), and contrastingly, recent keyboard/mouse interaction by the user with the computer 12 is indicative of the user's presence at the computer 12. Accordingly, the screen saver's state of activation serves as an indication of a user's state of presence at the computer 12, and likewise, due to their relative proximity to one another, at the telephone 10.

As shown in FIG. 2, a presence detection module (PDM) 120 is interposed in the interface between the OS 100 and the SS 110. The PDM 120 is a small program loaded and/or running on the computer 12 that reports to the IP telephony system (represented in FIG. 2 by box 130) the screen saver's state of activation as an indication of user presence at the telephone 10. Suitably, the PDM 120 detects the state of activation of the SS 110 by monitoring the appropriate signalling between the OS 100 and SS 110 or by monitoring the appropriate flag which is checked by the SS 110 to determine when to activate and deactivate, or otherwise acting as a proxy screen saver, i.e., essentially employing the same interface the SS 110 would otherwise have with the OS 100. The PDM 120 then formats and sends an appropriate message to the IP telephony system 130, e.g., a Transmission Control Protocol/Internet Protocol (TCP/IP) message or the like, that includes the screen saver's state of activation (i.e., activated or deactivated), which in turn is indicative of user presence (i.e., user not present if the SS 110 is activated or user present if the SS 110 is deactivated).

Suitably, the PDM 120 does not interfere with the interface between the OS 100 and SS 110 such that any SS activation/deactivation related signalling or communications are exchanged therebetween as normal. In this case, the PDM 120 would merely monitor those signals and/or communications. Optionally, the PDM 120 intercepts SS activation/deactivation signals and/or communications exchanged between the OS 100 and SS 110, and then relays them on to their designated destination after determining the corresponding activation state of the SS 110. Alternately, the PDM 120 acts in place of the SS 110 or is otherwise combined with the SS 110 to both control the output of the display 12a and report the screen saver's state of activation to the IP telephony system 130.

The presence information obtained by the telephony system 130 is optionally used in any number of ways to enhance operation of the same. For example, the telephony system 130 optionally employs a voicemail system 132 with a voice mailbox assigned to the telephone 10. An outgoing announcement for that voice mailbox is optionally selected from a group of such announcements based upon the presence information obtained relating to the user of the telephone 10. For example, a first outgoing announcement is played to a caller indicating that "the user is on the telephone" when it is detected that the telephone 10 is busy; a second outgoing announcement is played to a caller indicating that "the user is out of his office" when the telephone 10 is not answered after some number of rings and the user is detected as not present by the PDM 120; and, a third outgoing announcement is played to a caller indicating that "the user is in his office but unable to take your call at the time" when the telephone 10 is not answered after some number of rings and the user is detected as present by the PDM 120.

Optionally, in an alternate embodiment, the presence detection information obtained by the PDM 120 is also reported to one or more other systems or elements, e.g., an IM client and/or system, in addition to or in lieu of the telephony system 130. Likewise, these systems and/or elements also obtain the benefit of the reported information that may be similarly used to enhance their operation.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. In connection with a computer including an operating system and a screen saver, a method of detecting a user's presence at a workstation including the computer, said method comprising:
   (a) detecting signaling across an interface between the operating system and the screen saver, said signaling intended to selectively result in one of activation or deactivation of the screen saver;
   (b) determining that the user is not present at the workstation when the detected signaling is intended to result in screen saver activation; and,
   (c) determining that the user is present at the workstation when the detected signaling is intended to result in screen saver deactivation.

2. The method of claim 1, further comprising:
   (d) reporting the determinations of steps (b) and (c) to a telephony system.

3. The method of claim 2, wherein the telephony system is operatively connected to a packet-switched network.

4. The method of claim 2, wherein step (d) includes:
   formatting messages containing the reported determinations; and,
   transmitting the messages to the telephony system.

5. The method of claim 4, wherein the messages are Transmission Control Protocol/Internet Protocol (TCP/IP) messages.

6. In connection with a computer including an operating system that has an interface for communicating with a screen saver, said interface providing for screen saver communications intended to selectively result in screen saver activation and screen saver deactivation, a method of detecting a user's presence at a workstation including the computer, said method comprising:
   (a) detecting the screen saver communications;
   (b) determining that the user is not present at the workstation when the detected communications are intended to result in screen saver activation;
   (c) determining that the user is present at the workstation when the detected communications are intended to result in screen saver deactivation; and,
   (d) reporting the determination of steps (b) and (c) to an instant messaging client operative on the computer.

7. In a computer including an operating system and a screen saver, a module for detecting a user's presence at a workstation including the computer, said module comprising:
   means for detecting signaling across an interface between the operating system and the screen saver, said signaling intended to selectively result in one of activation or deactivation of the screen saver; and,
   means for determining: (i) that the user is not present at the workstation when the detected signaling is intended to result in screen saver activation; and, (ii) that the user is present at the workstation when the detected signaling is intended to result in screen saver deactivation.

8. The module of claim 7, further comprising:
   means for reporting the determinations of the determining means to a telephony system.

9. The module of claim 8, wherein the telephony system is operatively connected to a packet-switched network.

10. The module of claim 8, wherein reporting means includes:
    means for formatting messages containing the reported determinations; and,
    means for transmitting the messages to the telephony system.

11. The module of claim 10, wherein the messages are Transmission Control Protocol/Internet Protocol (TOP/IP) messages.

12. In a computer including an operating system that has an interface for communicating with a screen saver, said interface providing for screen saver communications intended to selectively result in screen saver activation and screen saver deactivation, a module for detecting a users presence at a workstation including the computer, said module comprising:
   means for detecting the screen saver communications;
   means for determining: (i) that the user is not present at the workstation when the detected communications are intended to result in screen saver activation; and, (ii) that the user is present at the workstation when the detected communications are intended to result in screen saver deactivation; and,
   means for reporting the determination of the determining means to an instant messaging client operative on the computer.

13. A workstation comprising:
   a computer having a visual display screen and an input device, both operatively connected to the computer;
   a operating system maintained on the computer for administering operation of the computer;
   a screen saver regulated by the operating system so as to selectively be in one of an activated or deactivated state, said screen saver being in the deactivated state when the input device is being used and in the activated state when the input device goes unused for a specified duration of time, such that while in said activated state the screen saver controls the display screen to depict at least one of no image or a non-static image; and,
   presence detection means for detecting a user's presence at the workstation from the state of the screen saver.

14. The workstation of claim 13, further comprising:
   communications means operatively connected to a telecommunications network for exchanging communications over the network, wherein the communications means receives information regarding the users presence at the workstation from the presence detection means.

15. A workstation comprising:
   a computer having a visual display screen and an input device, both operatively connected to the computer;
   a operating system maintained on the computer for administering operation of the computer;
   a screen saver regulated by the operating system so as to selectively be in one of an activated or deactivated state, said screen saver being in the deactivated state when the input device is being used and in the activated state when the input device goes unused for a specified duration of time, such that while in said activated state the screen saver controls the display screen to depict at least one of no image or a non-static image;
   presence detection means for detecting a user's presence at the workstation from the state of the screen saver; and,
   communications means including an instant messaging client operative on the computer, said communication means operatively connected to a telecommunications network for exchanging communications over the network, wherein the communications means receives information regarding the user's presence at the workstation from the presence detection means.

16. The workstation of claim 14, wherein the communications means includes a telephony system.

17. A workstation comprising:
   a computer having a visual display screen and an input device, both operatively connected to the computer;
   a operating system maintained on the computer for administering operation of the computer;
   a screen saver regulated by the operating system so as to selectively be in one of an activated or deactivated state, said screen saver being in the deactivated state when the input device is being used and in the activated state when the input device goes unused for a specified duration of time, such that while in said activated state the screen saver controls the display screen to depict at least one of no image or a non-static image;
   presence detection means for detecting a user's presence at the workstation from the state of the screen saver; and,
   communications means including an Internet Protocol (IP) telephone, said communication means operatively connected to a telecommunications network for exchanging communications over the network, wherein the communications means receives information regarding the user's presence at the workstation from the presence detection means.

18. The workstation of claim 14, wherein the telecommunications network is a packet-switched network.

* * * * *